April 16, 1929.  E. B. HESS  1,709,400
AUTOMOBILE PARKING DEVICE
Filed July 22, 1927
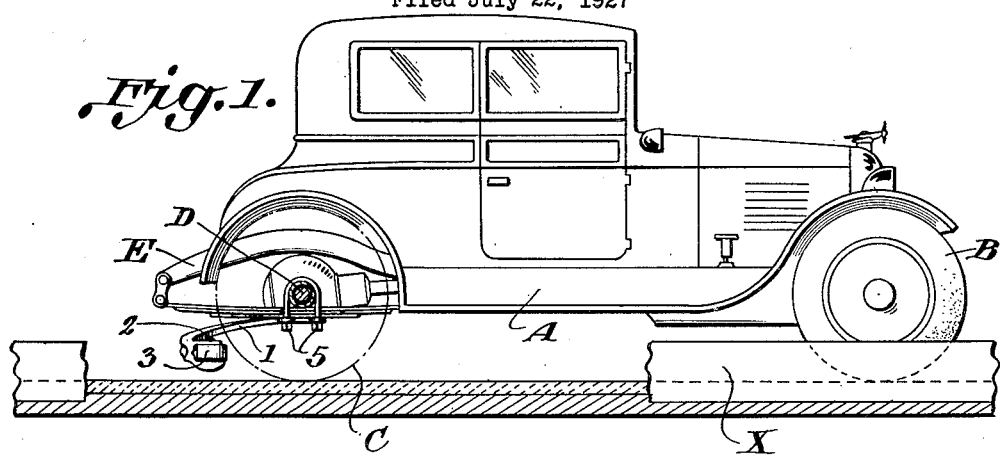

Patented Apr. 16, 1929.

1,709,400

UNITED STATES PATENT OFFICE.

EDWARD B. HESS, OF ORLANDO, FLORIDA, ASSIGNOR OF FORTY-NINE PER CENT TO JOHN D. RODGERS, OF ORLANDO, FLORIDA.

AUTOMOBILE PARKING DEVICE.

Application filed July 22, 1927. Serial No. 207,726.

This invention has for one purpose the production of a simplified and improved device adapted to obtain the same general result as the devices disclosed in my prior application No. 186,042 filed April 23, 1927, and the application of John D. Rodgers No. 186,308 filed April 25, 1927. The construction disclosed in these prior cases has been greatly simplified by the present invention.

The purpose of the invention is to provide an attachment which may be supported by the chassis of the automobile or by the rear axle housing and which carries a single roller supported at a point outside of and behind a rear wheel of the automobile but in proximity thereto so that when the machine is backed into parking position, this roller will come into contact with the curb and will cause the rear end of the machine to take up a position parallel with the curb. This permits the machine to be backed into position at a much sharper angle than usual and by preventing the wheels from coming into contact with the curb avoids any danger of damage thereto.

In a modified form the brackets which support the roller are hinged so that they may move upward if they come in contact with any surface obstruction on the roadway. Normally the roller is held in proper position by a spring or equivalent mechanism.

In the drawings:

Figure 1 is a side elevation of an automobile showing the invention in position.

Figure 2 is a top plan view of a rear portion of the chassis showing the operation of the device.

Figure 3 is a perspective view of the attachment detached from the machine.

Figure 4 is a side view of a portion of a modification.

Figure 5 is a top plan view of this modification.

This invention is applicable to any form of automobile or similar power driven vehicle and the drawings, therefore, disclose merely a conventional machine A having front wheels B, rear wheels C, a rear axle D and a chassis frame E. These elements may be of any old or desired construction and the invention is not to be regarded as limited by the drawings except as required by the scope of the claims.

The bracket 1 has a curved outer portion terminating in a fork 2 in which is supported a roller 3 for free rotation. The other end of the bracket 1 is formed into a plate 4 which is held in position underneath the axle housing by the usual U-bolts 5 which pass over the housing and through said plates. The second bracket 6 has a similar plate 7 which is attached to the other end of the axle housing by similar U-bolts 8. The other end of this bracket 6 is welded or otherwise rigidly fastened to the bracket 1 at or near the curved portion thereof. The brackets 1 and 7 are preferably slightly resilient in order that they may yield when the under side of the roller or its support comes in contact with an obstruction of any sort.

In the modified form shown in Figures 4 and 5 the bracket 1 and plate portion 4 are connected by a hinge 9 which allows the bracket 1 and roller to swing upward. The plate 4 is provided with a hook 10 on its lower face and the bracket 1 with a similar hook 11, which hooks are connected with a spring 12 that normally holds the roller 3 in its lowest position. The bracket 6 and plate 7 are also hinged by a pin 13.

The lower jaw of the fork 2 is enlarged and has a rounded lower surface 14 which will result in camming the bracket 1 upward if it comes in contact with any obstructions during the movement of the automobile. This enlarged portion also affords a countersink for the head of the bolt 15 upon which the roller 3 revolves.

It is believed that the operation of the device will be apparent from the above description. When the automobile is backed into parking position, the roller 3, which is positioned just in the rear and outside of the rear wheel C and at a point below the axle D, will come into contact with the curb X as shown in Figure 2 and the succeeding backward movement will cause the rear end of the automobile to take up a position parallel with the curb. This enables the machine to be backed into the curb at a much sharper angle than would otherwise be the case and facilitates parking in a limited space. It also prevents any damage to the tire because of the wheels coming into contact with the curb or the like.

It is obvious that various detail changes may be made without in any way departing from the spirit of the invention, which is to be regarded as limited only by the scope of the appended claims.

I claim as my invention:

1. A device for facilitating the parking of an automobile parallel with the curb or the like, which comprises brackets rigidly carried by the chassis of the automobile and revoluble means supported by the brackets and positioned just behind and outside the plane of a rear wheel of the automobile in position to contact with the curb when the automobile is backed into parking position.

2. A device for facilitating the parking of an automobile parallel with the cub or the like, which comprises brackets rigidly carried by the chassis of the automobile and connected thereto at a plurality of points in a line transverse of the automobile and revoluble means supported by the brackets and positioned just behind and outside a rear wheel in position to contact with the curb when the automobile is backed into parking position.

3. A device for facilitating the parking of an automobile parallel with the curb or the like, which comprises a bracket rigidly fastened at one end to the chassis of the automobile, a second bracket fastened at one end to the chassis of the automobile at a point at the other side thereof and rigidly connected to the first bracket intermediate its ends, and revoluble means carried by the free end of the first bracket and positioned just behind and outside a rear wheel in position to contact with the curb when the automobile is backed into parking position.

4. A device for facilitating the parking of an automobile parallel with the curb or the like, which comprises brackets rigidly carried by the chassis of the automobile, revoluble means supported by the brackets and positioned just behind and outside a rear wheel in position to contact with the curb when the automobile is backed into parking position, and means permitting the revoluble means to move upward if it comes into contact with an obstacle.

5. A device for facilitating the parking of an automobile parallel with the curb or the like, which comprises brackets rigidly carried by the chassis of the automobile, revoluble means supported by the brackets and positioned just behind and outside a rear wheel in position to contact with the curb when the automobile is backed into parking position, means permitting the revoluble means to move upward if it comes into contact with an obstacle, and spring means normally holding the revoluble means in operative position.

6. A device for facilitating the parking of an automobile parallel with the curb or the like, which comprises brackets rigidly carried by the chassis of the automobile, revoluble means supported by the brackets and positioned just behind and outside a rear wheel in position to contact with the curb when the automobile is backed into parking position, and a hinge in each bracket permitting the revoluble means to move upward if it comes into contact with an obstacle.

7. A device for facilitating the parking of an automobile parallel with the curb or the like which comprises means carried by the chassis of the automobile and revoluble means supported by the first named means and positioned just behind and outside the plane of a rear wheel of the automobile to contact with the curb when the automobile is backed into parking position, and thereby impart a lateral body movement to the rear end of the chassis independent of the steering mechanism.

In testimony whereof, I have hereunto subscribed my name.

EDWARD B. HESS.